UNITED STATES PATENT OFFICE.

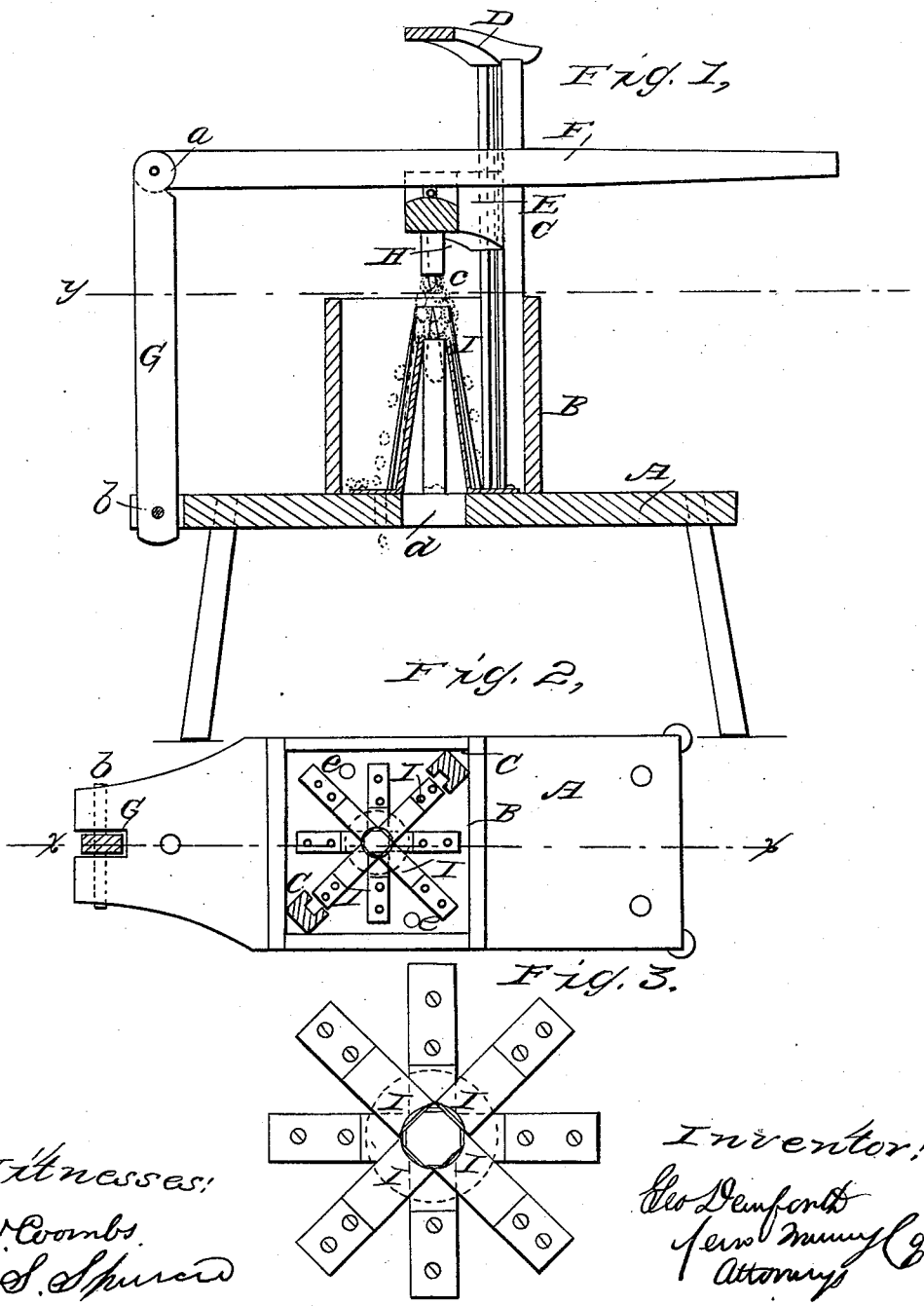

GEO. DANFORTH, OF FRIENDSVILLE, ILLINOIS.

CORN-SHELLER.

Specification of Letters Patent No. 29,673, dated August 21, 1860.

*To all whom it may concern:*

Be it known that I, GEORGE DANFORTH, of Friendsville, in the county of Wabash and State of Illinois, have invented a new and Improved Corn-Sheller; and I do hereby declare that the following is a full, clear, and exact description of the same, reference being had to the annexed drawings, making a part of this specification, in which—

Figure 1 is a side sectional view of my invention, taken in the line *x*, *x*, Fig. 2; Fig. 2, a horizontal section of the same, taken in the line *y*, *y*, Fig. 1; Fig. 3, a detached plan or top view of the springs.

Similar letters of reference indicate corresponding parts in the several figures.

To enable those skilled in the art to fully understand and construct my invention, I will proceed to describe it.

A, represents a bench of suitable height on which a box B is placed and C, C, are two uprights which are attached to the bench within the box B, the upper ends of the uprights being connected by a traverse bar D, and the inner surfaces of the uprights grooved vertically to receive the ends of a traverse bar E, which is allowed to slide freely up and down between the uprights.

To the traverse bar E, a lever F, is attached, and one end of this lever is secured by a pivot *a*, to an upright G, the lower end of which is attached by a pin *b* to one end of the bench A.

To the under side of the traverse bar E, at its center, a plunger H, is attached. This plunger is of cylindrical form, and has a short pin *c*, projecting down centrally from its lower end as shown plainly in Fig. 1.

Centrally within the box B, a series of springs or elastic bars I, are placed. These bars may be of steel and made transversely of slightly concave form. Their lower ends are bent in a horizontal position, and are secured to the top of the bench by bolts, and have a radial position around an opening *d*, in the bench. The other portions are slightly inclined and form a frustum of a hollow cone. The springs are not all placed in the same circle. One half of them are placed rather farther outward than the others, the outer ones breaking joints with the inner ones as shown in Fig. 3. The inner springs are also shorter than the outer ones as shown clearly in Fig. 1. This placing of the springs as described, prevents the shelled corn from obstructing their action. The upper ends of the springs form an expanding orifice to receive the ears of corn to be shelled, said orifice being of a size to act upon the smallest ears.

The operation is as follows: The operator grasps the lever F, with his right hand, and places the ears of corn in the orifice at the upper ends of the springs, forcing the ears, by depressing lever F, down between the upper ends of both the inner and outer most springs, the upper ends of which are sufficiently sharp to strip the grain from the cob, without cutting the latter. The plunger descends down between the springs a certain requisite distance, and the pin *c*, forces the cob down until it is free from the pressure of the springs and may drop by its own gravity. The elasticity of the springs compensates for the varying size of the ears.

The box B, prevents the grain from scattering as it is shelled, the shelled grain passing through orifices *e*, *e*, in the bench.

It will be seen that the traverse bar D has an oblique position relatively with the bench, owing to the uprights C, C, being placed diagonally within the box B. This position of the traverse bar admits of the operator readily feeding the ears to the springs.

I am aware that a single set of springs or elastic bars have been arranged in the form of a cone for shelling corn; but these do not operate equally well on large and small ears.

Having thus described my invention, what I claim as new, and desire to secure by Letters Patent is—

The arrangement together of the short and long springs I, in the manner shown for the purpose specified.

GEORGE DANFORTH.

Witnesses:
JOHN F. YOUNGKEN,
DAVID WILLIAMS.